United States Patent [19]

Kyrtsos et al.

[11] Patent Number: 5,067,572
[45] Date of Patent: Nov. 26, 1991

[54] DYNAMIC PAYLOAD MONITOR

[75] Inventors: Christos T. Kyrtsos; Dean A. Worrell, both of Peoria, Ill.

[73] Assignee: Caterpillar Inc., Peoria, Ill.

[21] Appl. No.: 569,899

[22] Filed: Aug. 20, 1990

[51] Int. Cl.$^5$ .................... G01G 19/08; G01G 19/10; G01G 19/40
[52] U.S. Cl. .................................. 177/139; 177/141; 177/25.14
[58] Field of Search ...................... 177/25.14, 139, 141

[56] References Cited

U.S. PATENT DOCUMENTS

| | | | |
|---|---|---|---|
| 4,055,255 | 10/1977 | Vasquez | 177/141 X |
| 4,230,196 | 10/1980 | Snead | 177/141 |
| 4,919,222 | 4/1990 | Kyrtsos | 177/139 |
| 4,981,186 | 1/1991 | Shankle et al. | 177/141 |
| 4,995,468 | 2/1991 | Fukuda | 177/139 |

Primary Examiner—George H. Miller, Jr.
Attorney, Agent, or Firm—Steven R. Janda; James R. Yee

[57] ABSTRACT

A dynamic payload monitor measures and displays payload weight for a loader vehicle during tip loading by sensing the hydraulic pressure of the lift and tilt cylinders and the geometry of an implement linkage. The payload weight is computed by curve fitting the sensed lift cylinder pressure and geometry data to a second order polynomial, and then performing interpolation or extrapolation with a pair of pressure versus position reference parabolas obtained during calibration. Tilt cylinder curves are derived by curve fitting tilt cylinder pressure and lift cylinder geometry data to a third order polynomial. The tilt cylinder curves are then compared to a plurality of tabulated tilt cylinder curves. Tip loading conditions are detected and the computed payload weight is modified in response to the magnitude of the tilt cylinder pressure. The weight computation algorithms used in the dynamic payload monitor are applicable to a number of work vehicles having at least one work implement linkage and at least two hydraulic cylinders for modifying the linkage geometry.

14 Claims, 7 Drawing Sheets

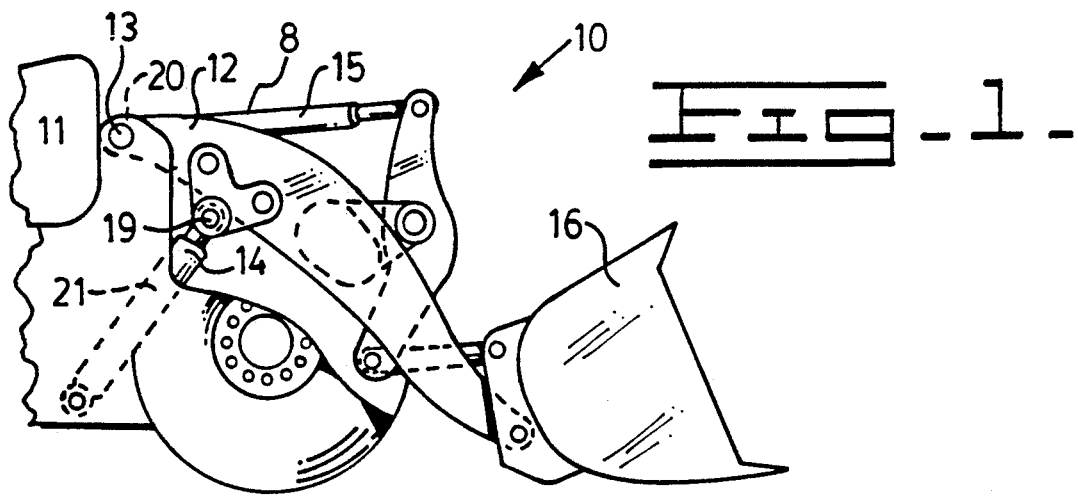
Fig_1_
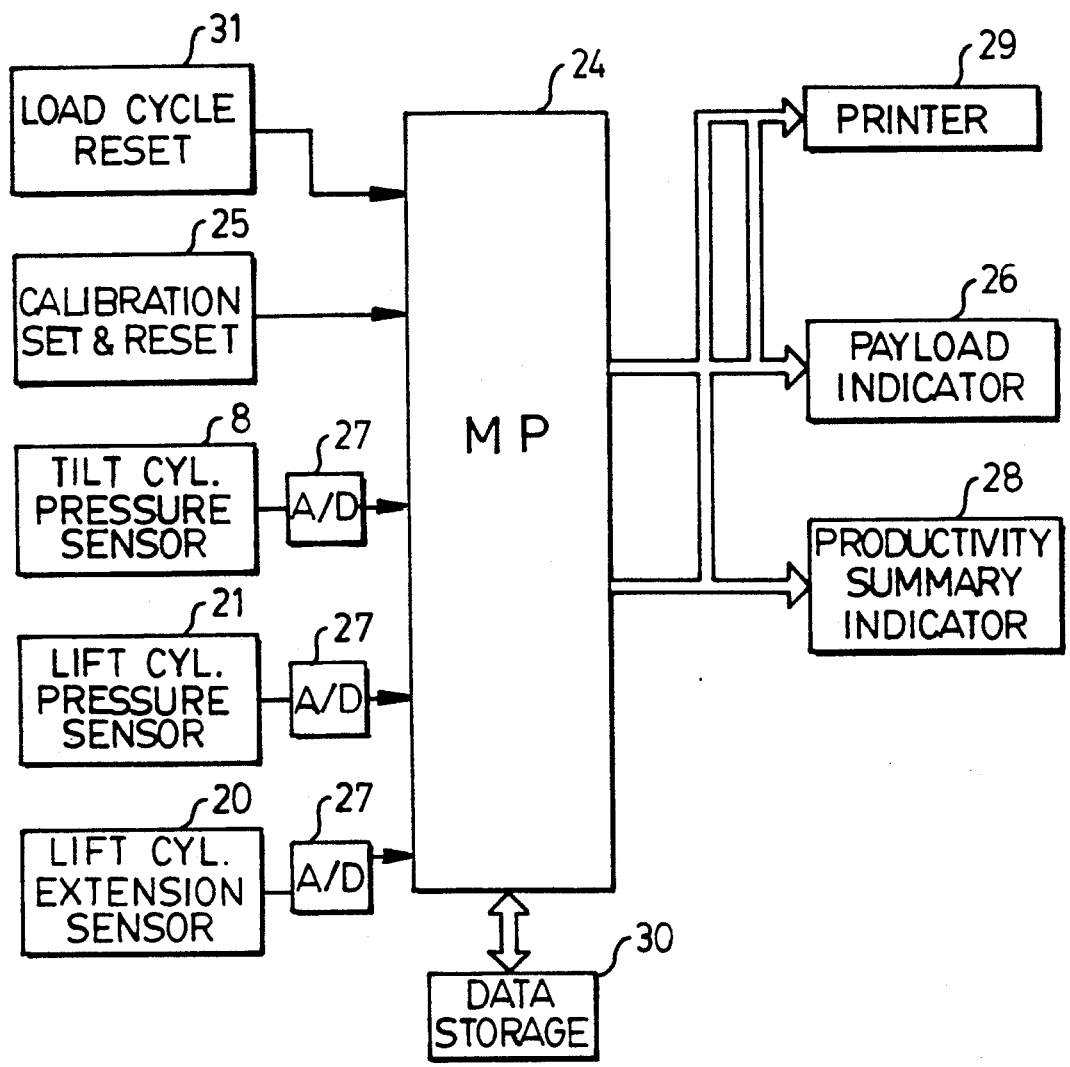
Fig_2_

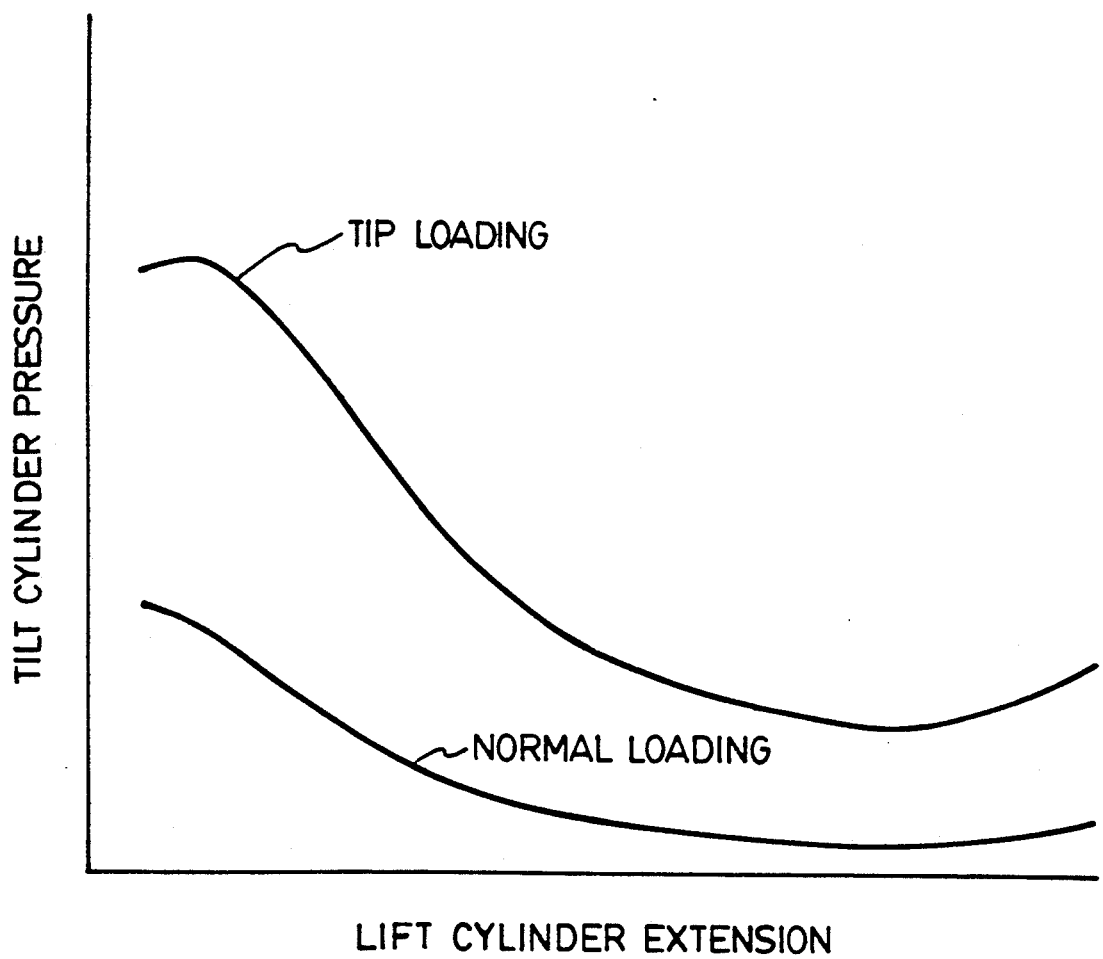
Fig_6_

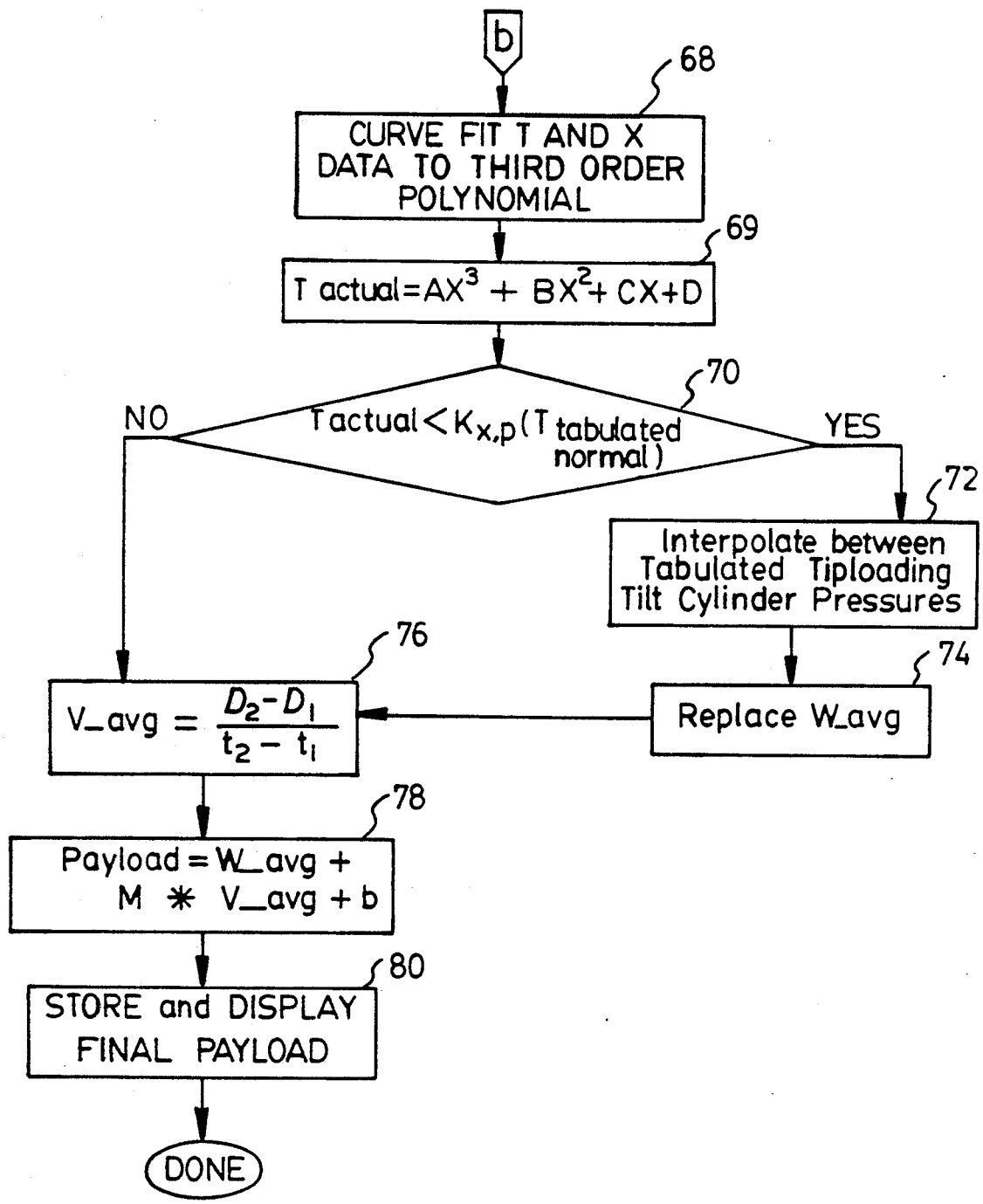
Fig_7b_

DYNAMIC PAYLOAD MONITOR

DESCRIPTION

1. Technical Field

This invention relates generally to vehicles for transferring bulk material and, more particularly, to an apparatus and method for weighing and indicating the weight of the bulk material being transferred.

2. Background Art

Vehicles such as loaders are used generally to transfer bulk material from a stock pile onto transport vehicles such as trucks or railroad cars. In such vehicle loading applications, it is desirable that the transport vehicles are loaded to, but not over, their maximum rated legal capacity. Underloading causes inefficiency in the material hauling cycle and underutilization of the transport vehicles. Overloading causes additional maintenance cost and extra wear on the truck tires and suspension system. Furthermore, the overloaded material may need to be unloaded to decrease load weight, causing additional expense.

Payload measurement is also desirable as a measure of the material hauling operation productivity. The ability to accumulate the weight of the material loaded during a single shift, during a twenty-four hour period, or during any other time period is valuable to an operations manager.

A number of payload measuring devices have been developed. One such device is described in U.S. Pat. No. 4,230,196, issued to Snead on Oct. 28, 1980. Snead discloses a load weighing and accumulating system for a loader. Snead's device includes a pressure sensor for detecting the hydraulic pressure in the lift cylinder of the loader, and a lift arm alignment member which provides a visual aid to the operator to facilitate positioning the lift arm and bucket at predetermined weighing locations. To measure the load in the loader bucket, the operator positions the lift arm by visually aligning the alignment members on the lift arm and the vehicle frame. Following a time delay, the load is weighed.

This device has several disadvantages. The amount of data sampled in one-half second is small and results in inaccurate measurements. This is especially significant when the vehicle is operating over rough terrain. The lift cylinder pressure rises when the vehicle hits a bump, and drops when the vehicle experiences "free fall" as it clears the bump. The same sharp pressure deviations occur when the vehicle encounters a surface depression, except the pressure first decreases then increases.

In a typical loader operation environment, the ground surface is uneven. The Snead device requires that the vehicle dynamics be at a steady state when the data sampling is taking place, which is not possible when the vehicle is traveling. Weighing accuracy is severely compromised because of the small data sampling window. The Snead device also requires that the operator maintain the position of the lift arm while measurement is taking place. This requirement has two implications. Because the cylinder pressure can vary over a large range depending on the lift arm position, if the operator fails to align the lift arm, the resultant payload measurement may be grossly erroneous. In addition, requiring the operator to stop the lift arm and position it with the alignment members interrupts the operator's pace and disrupts the loading process.

Furthermore, the Snead device requires the operator to position the bucket in the fully racked back position, or some other prespecified rotational position, in order to obtain accurate payload weight indications. If the bucket is tilted to a nonspecified position, errors are caused by the resulting shift in the center of gravity of the payload. As the center of gravity shifts, the effective moment arm of the payload acting about the linkage connection pivot pin also changes. Therefore, the amount of force exerted by the lift cylinder must also change in order to counteract the change in torque about the linkage connection pivot pin. In many applications, the vehicle operator does not position the bucket in the fully racked back position prior to or during the lifting operation. Such applications are known as "tip loading" and generally require the operator to maintain the bucket in a position significantly different from the fully racked back position.

U.S. Pat. No. 4,055,255, issued to Vasquez on Oct. 25, 1977, describes an apparatus and method for carrying and delivering payload of a predetermined weight. The Vasquez device senses hydraulic pressure in the cylinder supporting the bucket. Because of the peculiar configuration of the vehicle implement linkage, the lift cylinder of the bucket is generally upright except when the bucket is lowered to obtain a load. Therefore, the Vasquez device is a special application payload weighing device not suitable for usage on loaders having different and more conventional linkage configurations.

The present invention is directed to overcoming one or more of the problems set forth above.

DISCLOSURE OF THE INVENTION

The invention avoids the disadvantages of known payload measurement systems and provides a payload monitor that is accurate during tip loading operations, that does not alter or interfere with the operator's loading operation, and that is installable on existing or new loaders without linkage reconfiguration.

In one aspect of the present invention, an apparatus for dynamically measuring and indicating payload weight for a vehicle having at least one implement linkage including a linkage connection pivot pin is provided. The vehicle includes at least one lift cylinder and at least one tilt cylinder for modifying the geometry of the implement linkage. Devices deliver first, second, and third signals in response to the hydraulic pressure of the lift and tilt cylinders and the geometry of the implement linkage, respectively. The payload weight is calculated in response to the first, second, and third signals.

In another aspect of the invention, a method is provided for dynamically measuring and indicating payload weight for a vehicle having at least one implement linkage including a linkage connection pivot pin. The vehicle includes at least one lift cylinder and at least one tilt cylinder for modifying the geometry of the implement linkage. The method comprises the steps of sensing the hydraulic pressure of the lift and tilt cylinders and the geometry of the implement linkage. The payload weight is calculated in response to the sensed parameters.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which:

FIG. 1 is a side view of the forward portion of a loader vehicle;

FIG. 2 is a block diagram of an embodiment of the present invention;

FIG. 6 is a graphical representation of tilt cylinder pressure versus lift cylinder extension; and FIGS. 7A and 7B illustrate a flow chart of the computation portion of an algorithm used in the embodiment of FIG. 2.

BEST MODE FOR CARRYING OUT THE INVENTION

Figure 3:
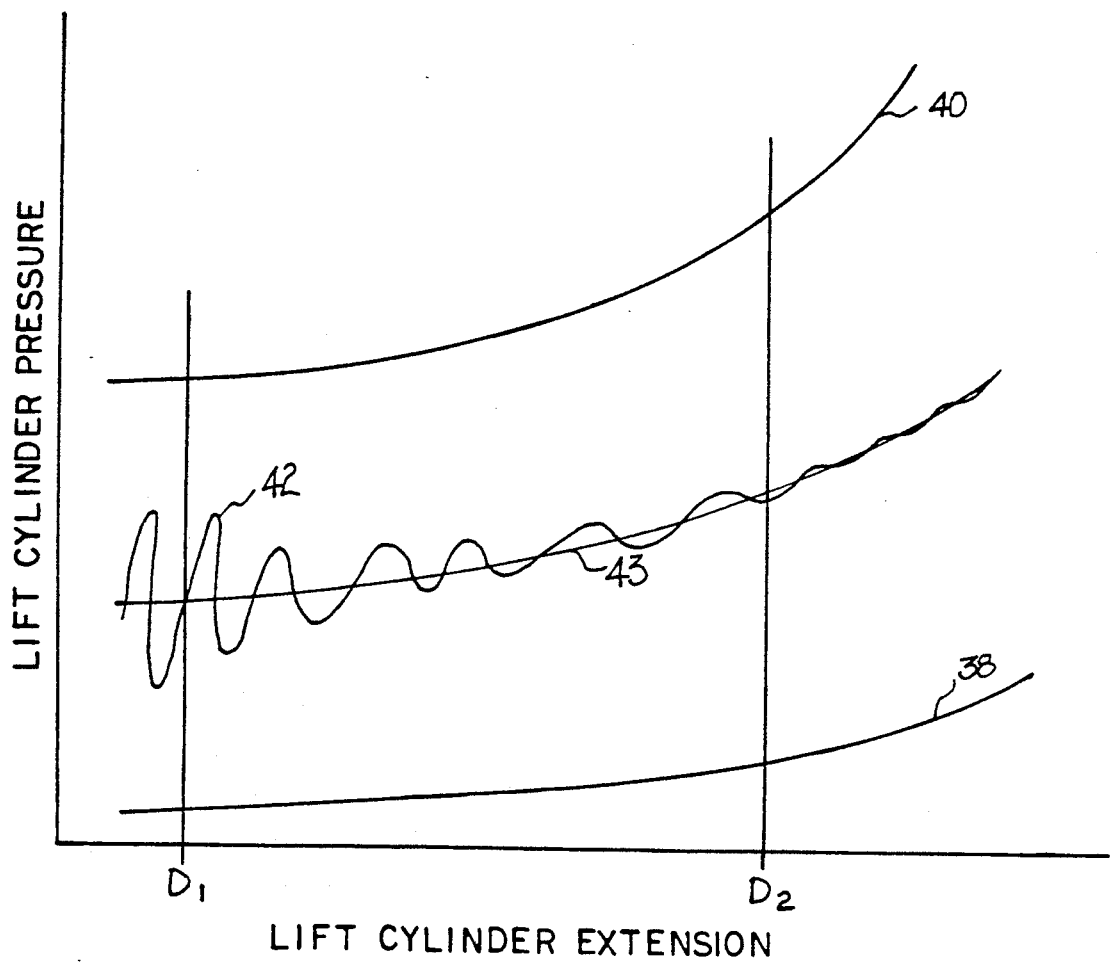
FIG. 3 is a graphical representation of lift cylinder pressure versus lift cylinder extension.

In FIG. 1, a payload monitoring system is generally represented by the element number 10. Although FIG. 1 shows a forward portion of a wheel type loader vehicle 11 having a payload carrier in the form of a bucket 16, the present invention is equally applicable to vehicles such as track type loaders, and other vehicles having similar loading implements. The bucket 16 is pivotally connected to a lift arm assembly 12 at a bucket pivot pin 9. The lift arm assembly 12 is pivotally actuated by two hydraulic lift cylinders 14 (only one of which is shown) about a pair of lift arm pivot pins 13 (only one shown) attached to the vehicle frame. A pair of lift arm load bearing pivot pins 19 (only one shown) are attached to the lift arm assembly 12 and the lift cylinders 14. The bucket 16 is pivotally movable between a dump position and a fully racked back position and is actuated by a tilt cylinder 15.

The preferred embodiment includes a rotary sensor 20 sensing the rotation of one of the lift arm pivot pins 13 from which the geometry of the lift arm assembly 12 or the extension of the lift cylinders 14 can be derived. The same rotary sensor 20 can be alternatively installed on the load bearing pivot pins 19 to provide the same information. Pressure transducers 8,21 sense the hydraulic pressure in the tilt cylinder 15 and one of the lift cylinders 14. Although there are two lift cylinders 14, the pressure in the cylinders is generally the same for a given payload and given lift arm assembly geometry. Thus, sensing pressure at one of the lift cylinders 14 is sufficient for the present application.

Referring to FIG. 2, the lift and tilt cylinder pressure and extension sensor signals are delivered to a microprocessor 24, after being processed by respective analog to digital (A/D) converters 27. A calibration control unit 25 enables calibration of the payload monitoring system 10. An operator can reset calibration data and enter calibration payload weight values using the calibration control unit 25. A load cycle reset control unit 31 enables the operator to indicate the beginning and end of a load cycle for a specific transporting vehicle or dump site. The calibration control 25 and the load cycle reset control 31 are preferably implemented in combination with payload weight and productivity summary indicators 26, 28, using a liquid crystal display screen (not shown) and an alphanumeric key pad (not shown). The payload weight indicator 26 displays the measured payload weight and any other weight data, such as a productivity summary of the loading operation of the loader vehicle 11. The preferred embodiment includes a printer 29 that produces hard copy reports, and capability to store information in a data storage unit 30 such as nonvolatile memory or a data disk drive.

FIG. 3 graphically illustrates the relationship between lift cylinder pressure and lift cylinder extension in an embodiment of the present invention. The lift cylinder pressure and extension data is plotted on a graph having the lift cylinder pressure on the vertical Y-axis and the lift cylinder extension on the horizontal X-axis. A first parabolic curve 38 represents the curve fitted pressure versus extension data for an empty loader bucket 16. A second parabolic curve 40 represents the curve fitted pressure versus extension data for a payload of known weight. This known weight is preferably at or near the rated load capacity of the vehicle 11. The parabolas can be represented mathematically by second order polynomials. The curves 38,40 are sampled and stored as reference weight curves for the payload monitor system during the calibration portion (FIG. 5) of the control algorithm.

As shown in FIG. 3, the lift cylinder pressure increases as the cylinder extension increases, so that the measured weight is dependent on the geometry of the lift arm assembly 12 as the bucket 16 is being raised from the ground to dump height. Because the loader is typically digging at the beginning of a work cycle and dumping at the end of the cycle, cylinder pressure varies drastically at each end of the cycle and the dynamics of the system are unstable. Therefore, weight measurement is confined to a time period when the lift cylinder extension displacement is between D1 and D2, where $D2 > D1$. This ensures a set of usable sample data that accurately represents payload weight during a relatively stable portion of the work cycle. Trace 42 represents the measured lift cylinder pressure versus cylinder extension. The random surges in the trace 42 denote the pressure variations in the lift cylinder during vehicle travel and directional changes.

Curve 43, which is shown superimposed over trace 42, has been curve fitted and averaged to remove the random pressure surges. The smoothed parabola 43 is an accurate representation of the pressure versus extension of the weight being measured. Experimentation has shown that lift cylinder pressure varies linearly with the weight of the payload at a particular cylinder extension for a specific lift velocity and bucket position. Therefore, the payload weight can be calculated by interpolation if the curve 43 falls between the reference curves 38,40, and by extrapolation if the curve 43 is outside of the reference curves 38,40.

Figure 4:
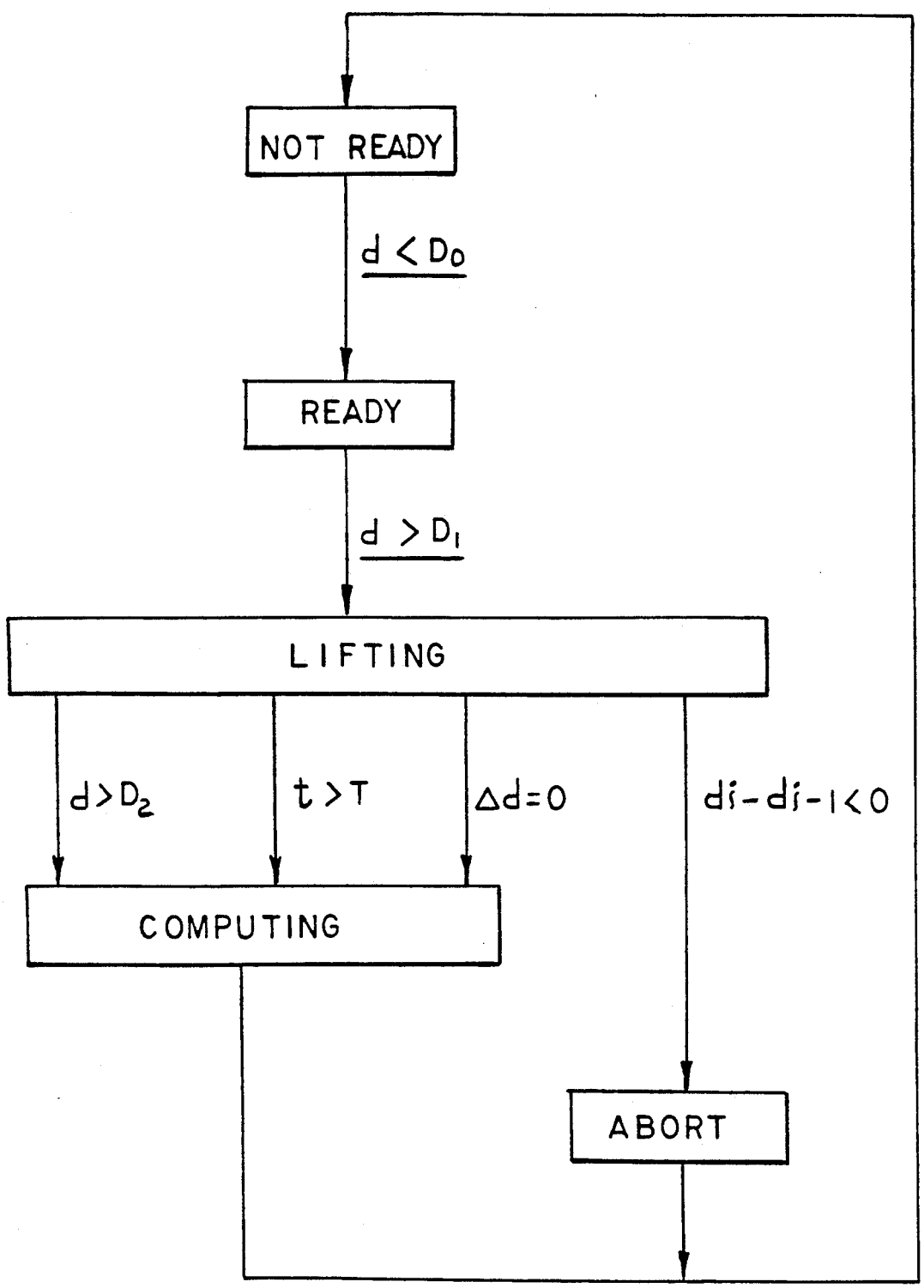
FIG. 4 is a state transition diagram of the system.

Referring to FIG. 4, a state transition diagram of the present invention is shown. The present embodiment of the payload monitor 10 makes a transition from state NOT READY to READY when the lift cylinder extension is less than a first predetermined set point $D_0$ ($d < D_0$). When the displacement (d) is less than $D_0$, the payload carrier or bucket 16 is most probably digging or crowding a pile. When the displacement is greater than another predetermined displacement set point $D_1$ ($d > D_1$), the vehicle 11 is lifting the payload carrier 16, and the present state is LIFTING. During LIFTING, cylinder pressure and position data are sampled.

Three conditions can cause state transition from LIFTING to COMPUTING. State transition occurs when cylinder extension exceeds another setpoint $D_2$ ($d > D_2$), signifying that the payload carrier has been raised and is approaching dump height. If, after T seconds, displacement $D_2$ still has not been reached ($t > T$), the system makes the same transition from LIFTING to COMPUTING. The third condition for the transition is when the cylinder displacement remains unchanged ($\Delta d=0$). This condition denotes most load-and-carry operations where the loader vehicle 11 performs as the transport vehicle and travels to the destination with the bucket 16 held at a constant level. The payload weighing algorithm is aborted (ABORT) when the payload carrier 16 is determined to have been lowered ($d_i - d_{i-1} < 0$). The values $D_0$, $D_1$, $D_2$, and T are determined according to the specific vehicle, and can be obtained by measurement and experimentation.

Figure 5:
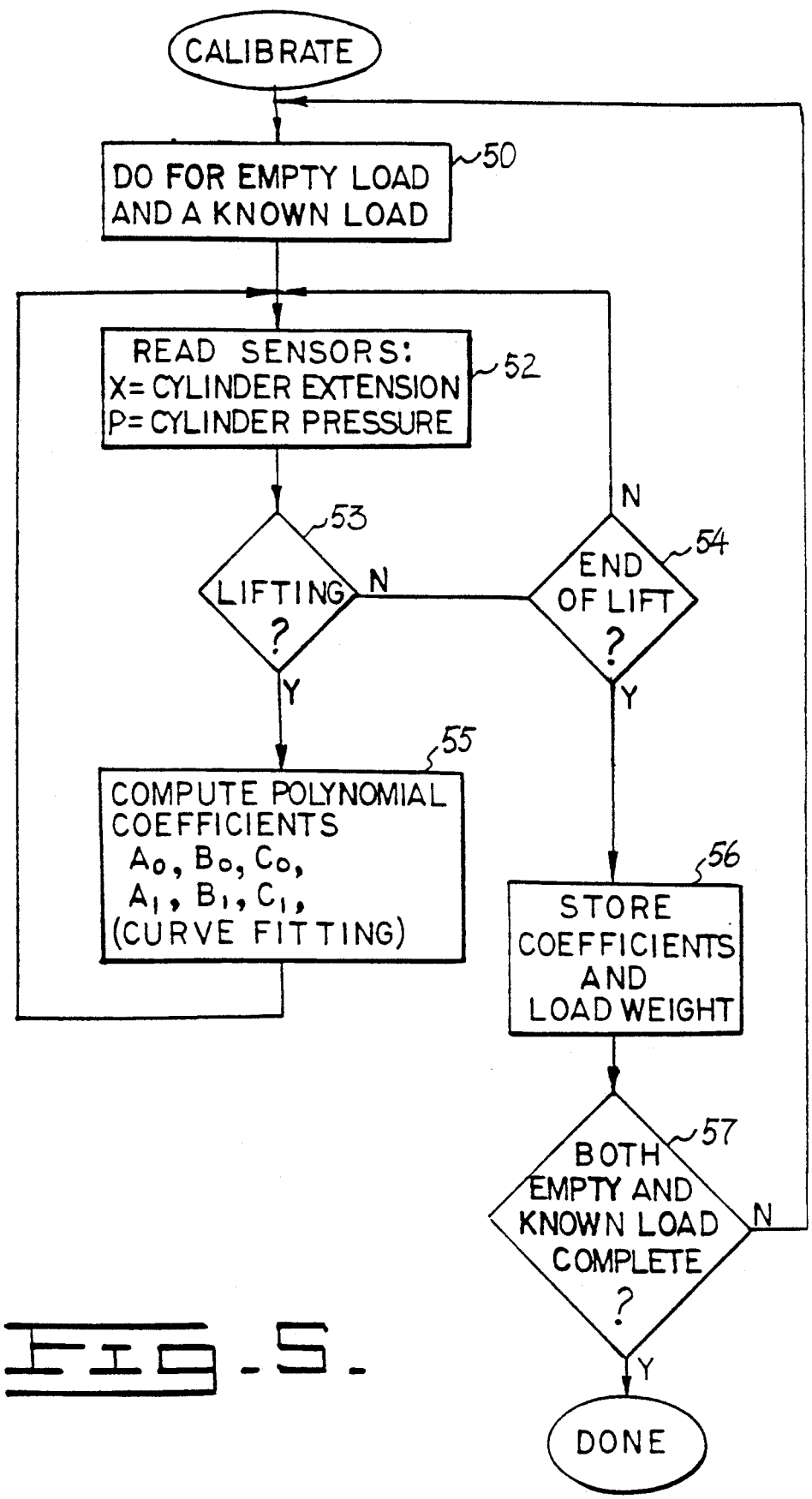
FIG. 5 is a flow chart of the calibration portion of an algorithm used in the embodiment of FIG. 2.

Keeping the state transition diagram of FIG. 4 in mind, reference is now made to the calibration flowchart of FIG. 5. Calibration is done sequentially with both an empty and a known load, as shown in block 50. The order in which calibration is performed is unimportant, but lift cylinder pressure and extension data for both reference weight values must be sampled. During calibration, the bucket 16 is preferably in the fully racked back position or some other preselected tilt position.

In block 52, the lift cylinder pressure and extension sensors 20,21 are read. The LIFTING state flag is checked at block 53, and if the payload is being lifted, the polynomial coefficients, $A_0$, $B_0$, $C_0$, $A_1$, $B_1$, $C_1$, for that specific pressure and position sample are computed at block 55. This is the step where the sampled sensor data points are curve fitted to a second order polynomial.

If the payload is not being lifted (LIFTING flag is false), then block 54 is checked to see if END OF LIFT has occurred. The END OF LIFT flag is true if any of the conditions for state transition from LIFTING to COMPUTING is true in FIG. 4. If the END OF LIFT conditions are not met, the algorithm returns to block 52 to continue to read the sensor inputs. Otherwise, in block 56, the coefficients are stored along with the payload weight, which is either zero for an empty bucket or nonzero for a known weight. Finally, a check is made at block 57 to make certain that both empty and known payload weights are sampled before completing the calibration algorithm.

Referring to FIG. 6, a graphical representation of tilt cylinder curves derived during normal and tip loading operations is shown. For a given payload and lift velocity, tilt cylinder pressure can be expressed as a third order function of lift cylinder extension. Under normal loading conditions, with the bucket 16 fully racked back, very little force is exerted on the tilt cylinder because the line of action of the force of gravity on the payload and bucket extends downwardly very near the center line of the bucket pivot pin 9. Under tip loading conditions, the center of gravity of the payload and bucket shifts forward and farther from the center line of the bucket pivot pin 9. As a result, the torque about the bucket pin 9 and the force exerted on the tilt cylinder 15 increases. As shown in FIG. 6 and at any lift cylinder extension value, the tilt cylinder pressure during tip loading is substantially greater than the pressure during normal loading.

Figure 7A:
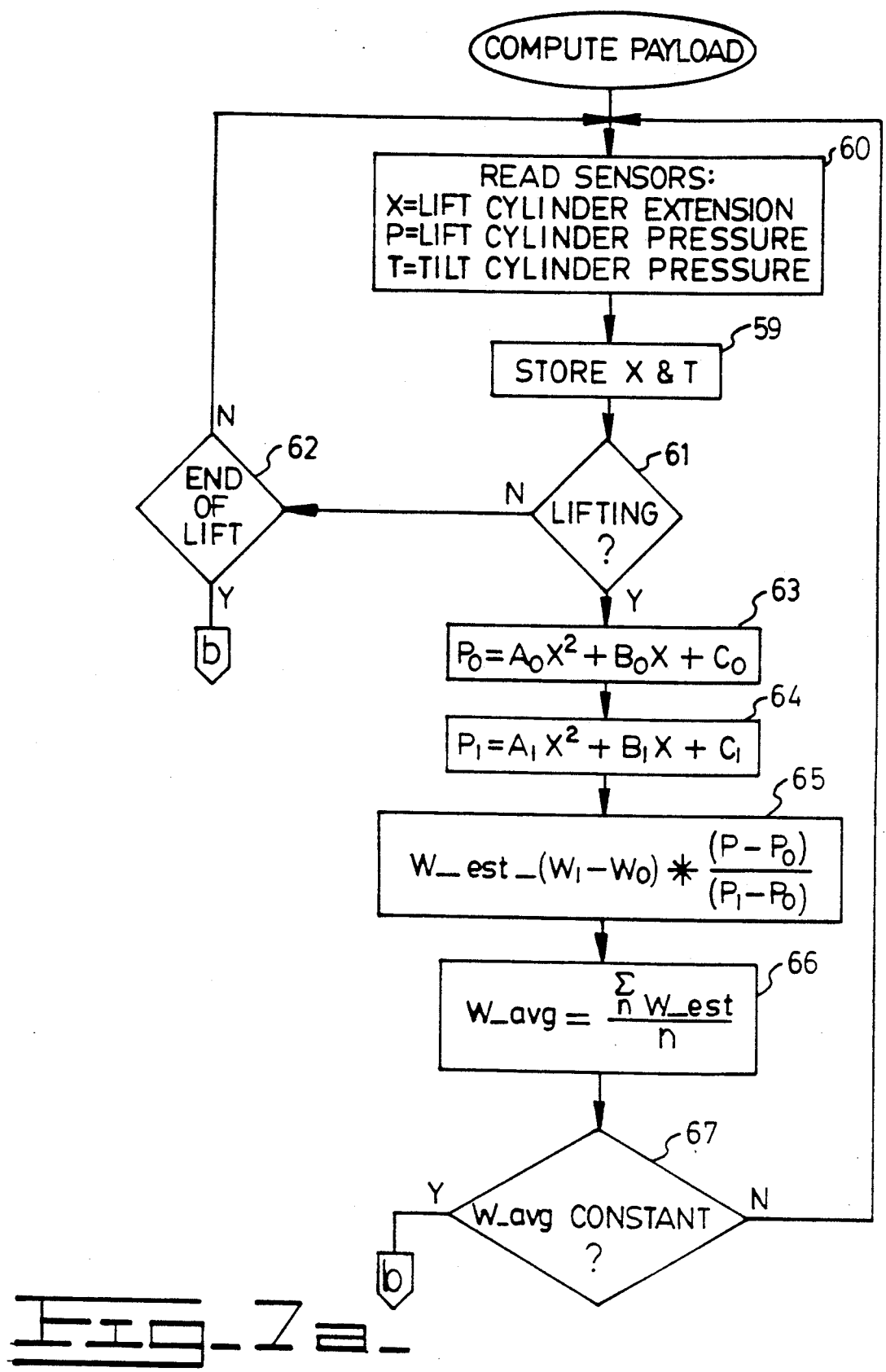

Referring next to FIGS. 7A and 7B, the payload weight calculation algorithm is discussed. Payload weight is calculated when the state of the system is LIFTING (refer back to FIG. 4). The lift and tilt cylinder pressure and extension sensors 20,8,21 are read in block 60. The readings from the tilt cylinder pressure and extension sensor 8,21 are stored 59 in memory (not shown). The LIFTING state flag is checked at this point in block 61. If the vehicle 11 is still lifting the payload carrier 16, the lift cylinder pressure $P_0$ for the empty payload carrier (zero payload weight) at that cylinder extension X is calculated in the block 63 by using coefficient values computed during calibration. Similarly, in the following block 64, the lift cylinder pressure $P_1$ for the known load at that lift cylinder extension X is computed. Next, the estimated payload weight W_est is calculated in the block 65 by using the following interpolate and extrapolate formula:

$$W\_est = (W_1 - W_0) * [(P - P_0)/(P_1 - P_0)]$$

where
$W_1$ is the known payload weight,
$W_0$ is the empty payload weight,
P is the current sampled pressure,
$P_1$ is pressure for the known load, and
$P_0$ is pressure for the empty load.
All the values above are values for the measured extension X. Then an average W_avg is computed for all the estimated weights W_est in block 66.

If, in block 67, the average weight has remained virtually constant for a predetermined amount of time, either lifting has ceased and there is no advantage in prolonging the sampling period or the lifting cycle is smooth and there is not enough noise in the sensed parameters to affect the measurement. If, at block 61, it is detected that the LIFTING state flag is no longer true, then the END OF LIFT flag is checked in block 62. This flag is true if any of the conditions for state transition from LIFTING to COMPUTING is true in FIG. 4. If the end of lift conditions are not met in one of the blocks 67 or 61, the algorithm returns to block 60 to continue to read sensor inputs. Otherwise, the stored tilt cylinder pressure and lift cylinder extension data is retrieved from memory and an actual third order polynomial is derived by curve fitting the data to a third order polynomial 68 using an error minimizing technique, preferably least squared error. The actual third order polynomial is then evaluated 69 at a preselected lift cylinder extension value that is preferably chosen to be approximately midway between the minimum and maximum lift cylinder extension values. However, any extension value may be used.

The parameters of a plurality of tabulated tilt cylinder curves are stored in memory. The tabulated tilt cylinder curves correspond to tilt cylinder pressure versus lift cylinder extension curves for a plurality of payload weights (W_avg) lifted with the bucket 16 in both the fully racked back position and the tip loading position (refer back to FIG. 6). The number of tabulated tilt cylinder curves is chosen in response to the desired degree of accuracy of the final payload weight indication and the range between the empty payload weight and the maximum rated payload weight.

In block 70, the tilt cylinder pressure value obtained in block 69 is compared to the tabulated racked back tilt cylinder pressure corresponding to the extension value used in block 69 and the W_avg value obtained in block 66. If the actual pressure is greater than the tabulated racked back pressure value multiplied by a predetermined constant, then tip loading is indicated. The predetermined constant is preferably determined empirically and is a function of lift cylinder extension and W_avg; however, the predetermined constant may also be identical for all extension and W_avg values.

If tip loading is indicated, the two tabulated tip loading tilt cylinder pressures that are nearest to the actual tilt cylinder pressure at the given lift cylinder extension are chosen and the W_avg values corresponding to these tabulated tip loading pressures are retrieved from memory. In the preferred embodiment, the tabulated tip loading and actual tilt cylinder pressures are used to extrapolate beyond or interpolate 72 between the W_avg values corresponding to the two chosen tabulated tilt cylinder pressures. Thus, a W_avg value is determined which indicates the actual payload in the bucket 16. The W_avg value determined in block 66 is replaced 74 by the W_avg value determined in block 72. Alternatively, the tip loading corrections 68,69,70,72,74 may be performed after block 65. In this way, each W_est value would be corrected as the data is taken.

Subsequent to the replacement step performed in block 72 or if the actual tilt cylinder pressure does not exceed the tabulated racked back tilt cylinder pressure multiplied by the predetermined constant, the average lift velocity V_avg is computed in block 68 by dividing the distance the lift cylinder 14 has extended by the amount of time it took.

As previously discussed, the lift cylinder pressure versus extension curves (or the payload weight derived therefrom) have a linear relationship with respect to the lift velocity, i.e. the faster the lift, the higher the payload weight value; therefore, adjustments need to be made to compensate for the linear shift. In block 69, the computed payload weight is adjusted by a value according to the computed average velocity. The values m and b in the linear equation $$m*V\_avg+b$$

are derived experimentally. Thereafter, in block 70, the computed payload value is stored and displayed. The payload values may also be used in computing productivity summaries, and may be accumulated for specific transport vehicles and dump sites.

INDUSTRIAL APPLICABILITY

The operation of the present invention is best described in relation to its use in tip loading applications where knowledge of payload weight is important. This payload measurement system is also valuable in operations where it is desirable to monitor loader vehicle productivity.

Prior to using the payload monitor 10, the system must be calibrated. Calibration must also be repeated whenever there has been a change in the lift arm assembly configuration, such as switching to a different bucket 16 or substantial overhaul of any of the lift arm assembly subsystem. Calibration of the payload monitor 10 includes lifting the lift arm assembly 12 from ground level to dump level with an empty bucket 16, entering the payload weight, and repeating the procedure with material of a known weight in the bucket 16. Preferably, the known weight is near or at the rated capacity of the loader vehicle 11. The bucket 16 should be racked back during the lifting process to ensure that the center of gravity (C.G.) of the payload weight remains near the center of the bucket 16.

A typical tip loading operation of a loader 11 includes, sequentially: obtaining a load and maintaining the bucket 16 in a tilted, tip loading position, traveling to a dump site or a transport vehicle while continuously raising the bucket 16, and finally dumping the load. This tip loading cycle is not interrupted by the usage of the dynamic payload monitor 10, because stopping the vehicle 11 is not required and the bucket 16 is not required to be positioned at a specific height for a period of time. The operator simply resets the load cycle, enters the assigned dump vehicle or site number if such function is desired, and proceeds to load and dump following a normal work cycle. In addition, productivity summaries and hard copies of such and other payload information may be obtained from the system 10. The payload data may also be downloaded to a data disk for storage or for analysis in an office setting.

The present invention is also expandable to other vehicles with different linkage configurations by compensating for the difference thereof. Anticipated applicable vehicle types are excavators, front shovels, backhoe loaders, and any vehicles having at least one linkage with at least two hydraulic cylinders for modifying that linkage configuration. For these vehicle linkage configurations, additional pressure and position sensors may be needed to detect cylinder pressure and linkage geometry during the work cycle. However, the basic payload weight calculation remains the same, using curve fitting methods and two reference weight parabolic equations.

Other aspects, objects, and advantages of this invention can be obtained from a study of the drawings, the disclosure, and the appended claims.

We claim:

1. An apparatus for dynamically measuring and indicating payload weight for a vehicle having at least one implement linkage including a linkage connection pivot pin, said vehicle including at least one lift cylinder and at least one tilt cylinder for modifying said implement linkage geometry, said apparatus comprising:
   means for sensing the hydraulic pressure of said lift cylinder and responsively producing a first signal;
   means for sensing the hydraulic pressure of said tilt cylinder and responsively producing a second signal;
   means for sensing said implement linkage geometry and responsively producing a third signal; and
   means for receiving said first, second, and third signals and responsively deriving a payload weight.

2. An apparatus, as set forth in claim 1, wherein said means for sensing implement linkage geometry senses rotation of said linkage about said linkage connection pivot pin.

3. An apparatus, as set forth in claim 1, wherein said means for receiving said first, second, and third signals and responsively deriving a payload weight produces first and second reference payload curves, and calculates an actual payload curve by interpolating between said first and second reference payload curves in response to said first signal value being within the area bounded by said reference payload curves, and by extrapolating beyond said first and second reference payload curves in response to said first signal value being outside of the area bounded by said reference payload curves.

4. An apparatus, as set forth in claim 3, wherein said means for receiving said first, second, and third signals and responsively deriving payload weight includes means for detecting tip loading conditions and modifying said payload weight in response to detecting said tip loading conditions.

5. An apparatus, as set forth in claim 3, wherein said payload curves are represented by quadratic equations.

6. An apparatus, as set forth in claim 3, wherein said means for receiving said first, second and third signals and responsively deriving payload weight includes:

means for storing a plurality of tabulated tilt cylinder curves representing tilt cylinder pressure versus lift cylinder extension;

means for deriving actual tilt cylinder curves in response to said second and third signals;

means for comparing said actual tilt cylinder curves with said tabulated tilt cylinder curves; and means for modifying said payload weight in response to said comparison between said actual and tabulated tilt cylinder curves.

7. An apparatus, as set forth in claim 6, wherein said tilt cylinder curves are represented by third order polynomials.

8. An apparatus, as set forth in claim 3, wherein said means for receiving said first, second, and third signals and responsively deriving payload weight compensates for variable lift cylinder extension velocity by linearly shifting said payload curves.

9. A method for dynamically measuring and indicating payload weight for a vehicle having at least one implement linkage including a linkage connection pivot pin, said vehicle including at least one lift cylinder and at least one tilt cylinder for modifying said implement linkage geometry, said method comprising the steps of:

sensing the hydraulic pressure of said lift cylinder and responsively producing a first signal;

sensing the hydraulic pressure of said tilt cylinder and responsively producing a second signal;

sensing said implement linkage geometry and responsively producing a third signal; and receiving said first, second, and third signals and responsively deriving a payload weight.

10. A method, as set forth in claim 9, wherein said step of sensing said implement linkage geometry includes the step of sensing rotation of said linkage about said linkage connection pivot pin.

11. A method, as set forth in claim 9, wherein said step of receiving said first, second, and third signals and responsively deriving payload weight includes the steps of:

producing first and second reference payload curves; and calculating an actual payload curve by interpolating between said first and second reference payload curves in response to said first signal value being within the area bounded by said reference payload curves, and by extrapolating beyond said first and second reference payload curves in response to said first signal value being outside of the area bounded b said reference payload curves.

12. A method, as set forth in claim 11, wherein said step of receiving said first, second, and third signals and responsively deriving payload weight includes the steps of detecting tip loading conditions and modifying said payload weight in response to detecting said tip loading conditions.

13. A method, as set forth in claim 11, wherein said step of receiving said first, second, and third signals and responsively deriving payload weight includes the steps of:

deriving actual tilt cylinder curves in response to said second and third signals;

comparing said actual tilt cylinder curves with tabulated tilt cylinder curves; and modifying said payload weight in response to said comparison between said actual and tabulated tilt cylinder curves.

14. A method, as set forth in claim 11, wherein said step of receiving said first, second, and third signals and responsively deriving payload weight includes the step of compensating for variable lift cylinder extension velocity by linearly shifting said payload curves.

* * * * *